July 14, 1970        J. R. HARVEY        3,520,271
SEA HORSE
Filed April 21, 1969        2 Sheets-Sheet 1
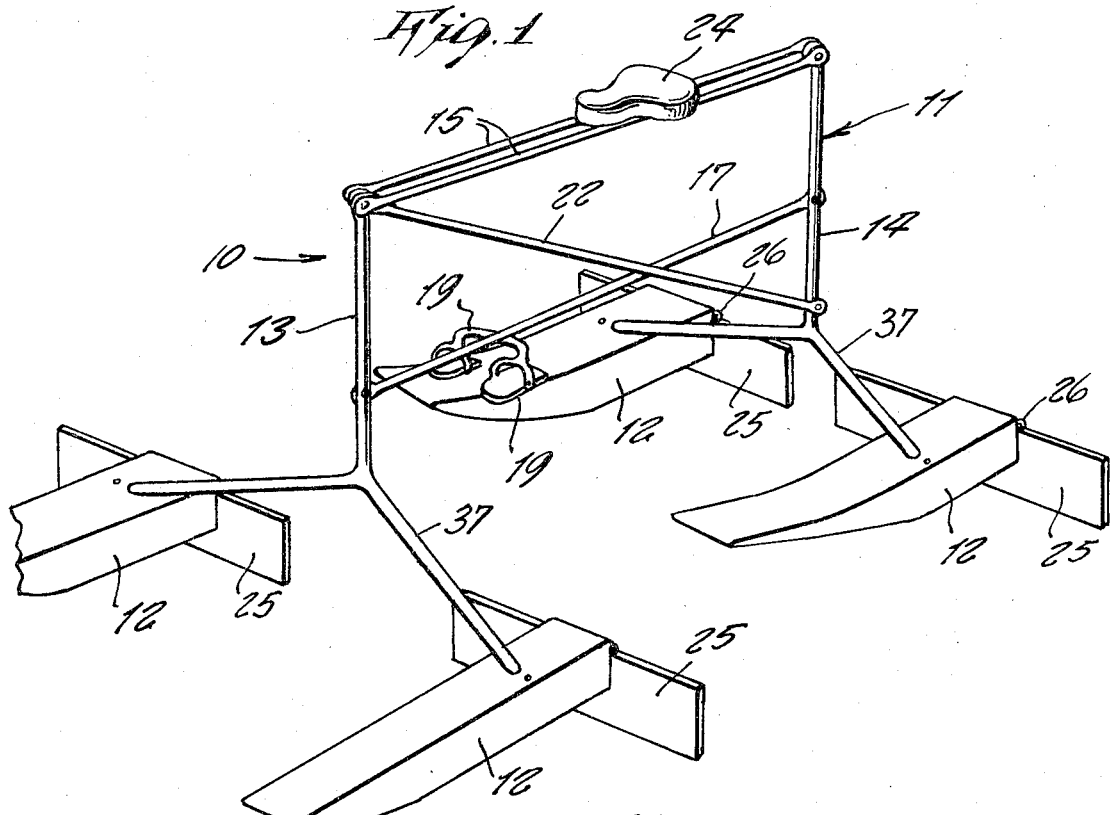
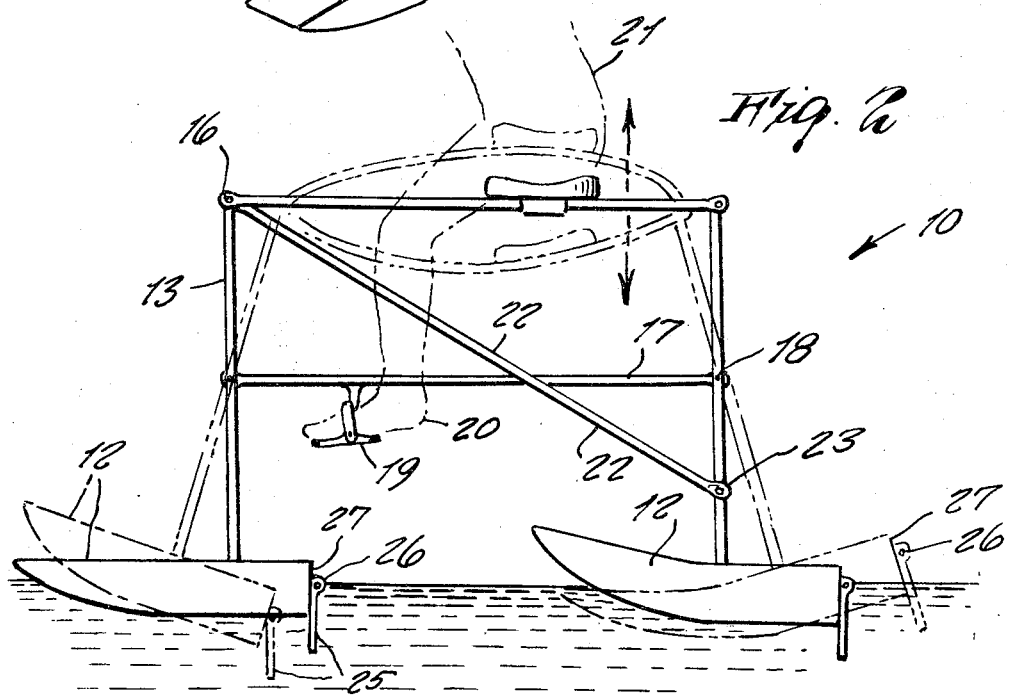
INVENTOR
JAMES R. HARVEY July 14, 1970  J. R. HARVEY  3,520,271
SEA HORSE
Filed April 21, 1969  2 Sheets-Sheet 2
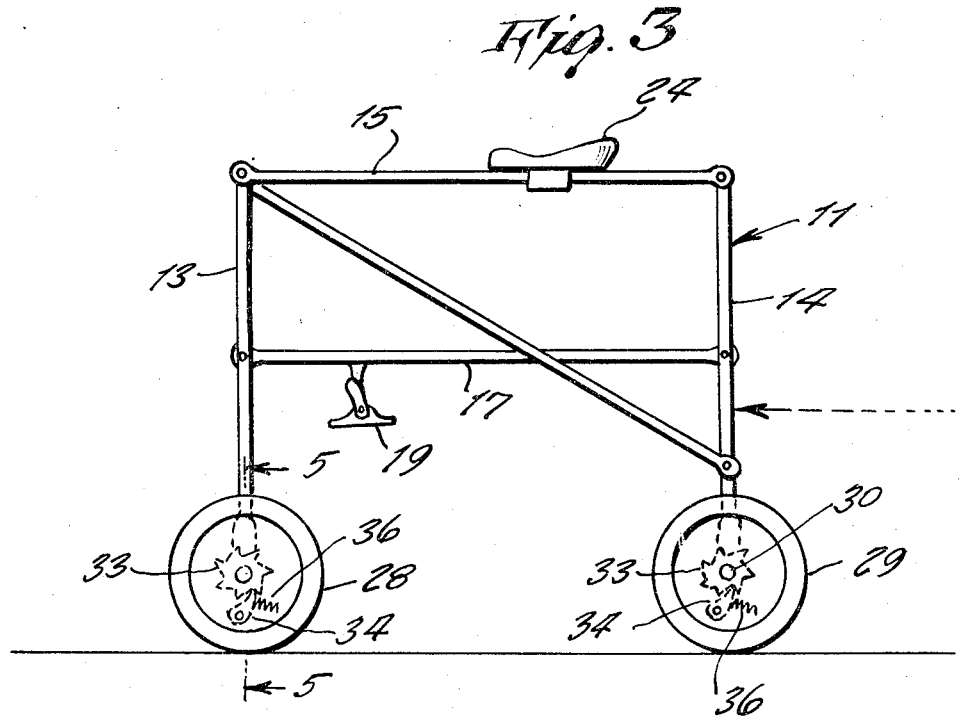
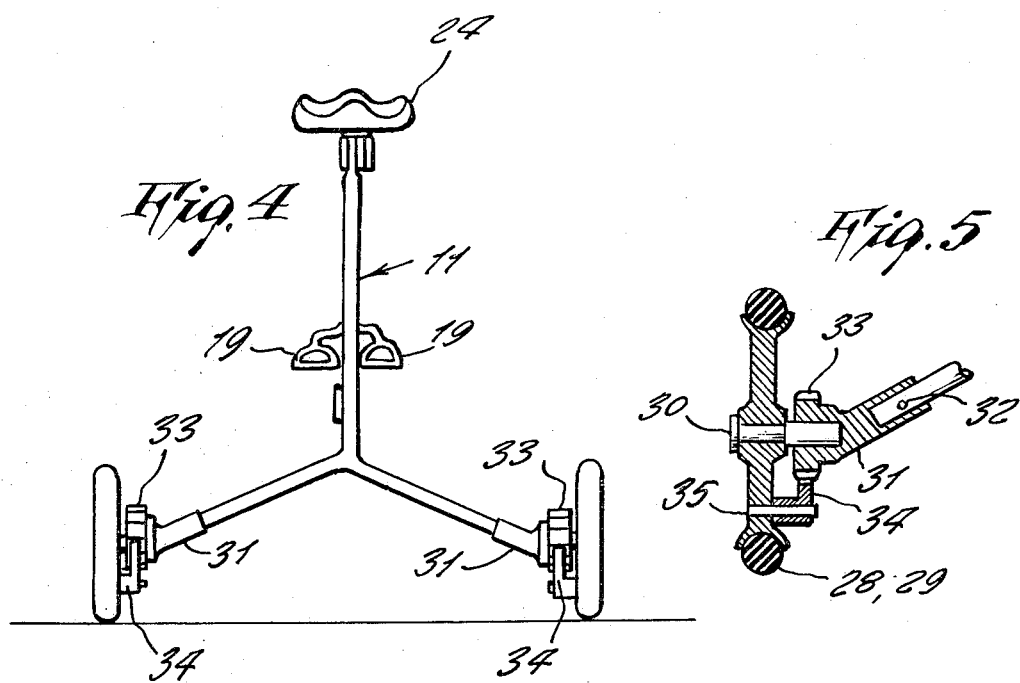
INVENTOR
JAMES R. HARVEY 3,520,271
Patented July 14, 1970

1

3,520,271
SEA HORSE
James R. Harvey, 320 Elliott Road,
Monroeville, Pa. 15146
Filed Apr. 21, 1969, Ser. No. 817,774
Int. Cl. B63h 1/32
U.S. Cl. 115—28          4 Claims

ABSTRACT OF THE DISCLOSURE

An aquatic toy ride for permitting a person to travel upon the surface of water, the device comprising a flexing frame mounted upon a plurality of pontoons, and wherein a bouncing motion of a person will flex the frame thus causing the pontoons to be intermittently forwardly advanced for travel upon the water surface.

---

This invention relates generally to aquatic ride devices.

A principal object of the present invention is to provide a sea horse upon which a rider may travel when moving across the surface of water.

Another object of the present invention is to provide a sea horse wherein there is a flexible frame mounted upon a plurality of bouyant pontoons, and wherein a vertical bouncing movement of a rider upon the frame will cause the pontoon to be intermittently moved forwardly, thus allowing the device to advance in a forward direction across the water.

Another object of the present invention is to provide a sea horse which will promote a healthful outdoor physical exercise by a rider.

Still another object of the present invention is to provide a sea horse wherein the pontoons may be readily replaced by a plurality of wheels, thereby allowing the sea horse to be adaptable for travel across the surface of the ground.

Other objects of the present invention are to provide a sea horse which is simple in design, inexpensive to manufacture, rugged in construction, easy to use and efficient in operation.

These and other objects will be readily evident upon a study of the following specification and the accompanying drawings wherein:

FIG. 1 is a perspective view of the present invention shown designed for use upon the surface of water, FIG. 2 is a side elevation view of the present invention shown in operative use, FIG. 3 is a side elevation view of the present invention shown adapted for use upon the ground, FIG. 4 is a front elevation view thereof, and FIG. 5 is an enlarged cross-sectional view taken on the line 5—5 of FIG. 3.

Referring now to the drawings in greater detail, and more particularly to FIGS. 1 and 2 at first, the reference numeral 10 represents a sea horse according to the present invention wherein there is a frame 11 that is supported upon a plurality of bouyant pontoons 12.

The frame 11 is comprised of a front leg 13, a rear leg 14, each of the legs having an inverted Y configurated base 37 for attachment to two of the bouyant pontoons 12. Each leg 12 may be made of tubular light weight metal, such as aluminum and is highly polished.

A pair of parallel horizontally extending flexors 15 are connected to the upper ends of the legs, the flexors being connected to the upper ends of the legs by means of rivets 16, thereby permitting flexing of the flexors respective to the legs. A horizontally extending brace 17 is connected pivotally free by means of rivets 18 to the approximate intermediate portions of legs, as shown in the drawing. The horizontal brace 17 is provided with

2 a pair of stirrups 19, so as to allow supporting feet of a rider 21. A diagonally extending brace 22 extends from an upper corner of the front leg 13 and the forward corner of the flexors 15, the diagonal brace 22 being connected at its rear end flexibly upon a rivet 23 secured along an intermediate portion of the rear leg 14.

A seat 24 is slidably mounted upon the flexors 15, the seat being slideable so as to assume a position which is comfortable to a rider respective to the distance from the stirrups.

Each of the pontoons 12 comprises a bouyant member having a forward end that is generally streamlined so as to allow the pontoon to be moved through the surface of the water. Each of the pontoons includes a flat paddle 25 attached pivotly free upon a hinge 26 secured to the rear end 27 of the pontoons.

A careful examination of FIG. 2 of the drawing will readily indicate that each of the paddles 25 may readily pivotable rearwardly from the rear end of the pontoon, however, the paddles cannot flex forwardly due to the rear wall 27 of the pontoon.

In operative use, when the sea horse is used for travel across the surface of water, the rider 21 will bounce up and down upon the flexors 15 as indicated by the dotted lines in FIG. 2 of the drawing. This movement causes the front and rear legs of the frame to flex in the direction indicated by the dotted lines.

As the legs are thus bent angularly, the pontoons are moved forwardly and rearwardly. As the legs intermittently thus move between a diagonal and a vertical direction, the pontoons are thus forced to movement through the water. In view that the paddles 25 will prevent the pontoons 12 to move rearwardly, the paddles 25 thus cause the sea horse to advance forwardly, thus permitting the device to travel across the surface of the water.

In FIGS. 3 to 5, the present invention is devised for use on travel across the surface of the ground.

In FIGS. 3 to 5, the present device includes the same frame 11, as shown in FIGS. 1 and 2 and wherein the frame includes the front legs and rear legs 13 and 14. The same parallel flexors 15 are employed, the flexors supporting the seat 24. The same horizontal brace 17 is connected to the legs, the horizontal brace 17 supporting the stirrups 19.

In the present form of the invention, the frame is mounted upon a pair of front wheels 28 and a pair of rear wheels 29.

Each of the wheels are mounted upon a hub 31 secured by means of pins 32 to the inverted Y configurated base of the frame 11. The hub 31 includes a ratchet gear 33 which engages a ratchet pawl 34, the pawl being mounted upon a pin 35 secured to a side of the wheel. A tension spring 36 normally urges the pawl 34 to remain in normal engagement with the ratchet gear 33.

In operative use, the device is operated the same as the sea horse and wherein a bouncing movement of the driver will cause the wheels to be rotated in one direction only, thereby causing the vehicle to advance in a forward direction when travelling across the ground.

What I now claim is:

1. In a sea horse, the combination of a frame, said frame including a front leg and a rear leg, a pair of flexors, the ends of said flexors being connected pivotly free to said upper ends of said legs, and said flexors being flexible to permit a bouncing movement of a rider thereupon, said flexors supporting a seat, a horizontal brace between said front and rear legs, said horizontal brace carrying a pair of stirrups and a diagonal brace extending between an upper corner of said front leg and a lower portion of said rear leg.

2. The combination as set forth in claim 1, wherein said front leg and said rear leg of said frame are each provided with an inverted Y configurated base, said Y configurated base being adaptable for interchangeably being selectively mountable with a plurality of bouyant pontoons or a plurality of wheels.

3. The combination as set forth in claim 2, wherein each said bouyant pontoon comprises a forwardly extending bouyant member having an arcuate forward end for the purpose of streamline travel through the water, each said pontoon having a transverse extending paddle secured hingedly free paddle secured thereto, each said paddle being freely moveable to pivot in a rearward direction but being prevented from forward pivotal travel respective to said pontoon.

4. The combination as set forth in claim 3, wherein each of said wheels is mounted rotatably upon a shaft supported in a hub, said hub being receivable over the lower end of said inverted Y configurated base and secured thereto by means of pins, said hub including a ratchet gear, said ratchet gear engaging a pawl pivotable about a pin secured to a side of said wheel, and a compression spring normally urging said pawl into engagement with said ratchet gear, thereby permitting rotation in one direction only.

References Cited

UNITED STATES PATENTS 2,379,192   6/1945   Sebel _____ 280—1.182

ANDREW H. FARRELL, Primary Examiner